United States Patent [19]
Toyama

[11] Patent Number: 5,944,299
[45] Date of Patent: Aug. 31, 1999

[54] ROTATION SWITCHING MECHANISM IN ROTARY TYPE SWITCHING VALVE

[75] Inventor: Isamu Toyama, Fuji, Japan

[73] Assignee: Fuji Injector Corporation, Kanagawa-ken, Japan

[21] Appl. No.: 08/728,982

[22] Filed: Oct. 11, 1996

[30] Foreign Application Priority Data

Aug. 28, 1996 [JP] Japan ................................. 8-227187

[51] Int. Cl.⁶ ................................................. F16K 31/02
[52] U.S. Cl. ................................. 251/129.2; 251/129.1
[58] Field of Search ............................ 251/129.2, 129.1, 251/129.11, 251

[56] References Cited

U.S. PATENT DOCUMENTS

| | | | |
|---|---|---|---|
| 1,631,161 | 6/1927 | Russell et al. | 251/129.1 |
| 3,244,397 | 4/1966 | Fattor | 251/129.2 X |

FOREIGN PATENT DOCUMENTS 417006  11/1910  France ............................... 251/129.1

*Primary Examiner*—Kevin Lee
*Attorney, Agent, or Firm*—Wenderoth, Lind & Ponack, L.L.P.

[57] ABSTRACT

A rotation switching mechanism in a rotary type switching valve comprises a rotor serving as a movable switching valve, a pressure receiving portion disposed at an eccentric position of the rotor and rotatable in unison with the rotor, a first electromagnet and a second electromagnet placed opposite the first electromagnet with the pressure receiving portion situated therebetween. The first and second electromagnets are formed of one-way bias type electromagnets having no return springs. By supplying electric current to a selected one of the first and second, electromagnets, a slider of the selected electromagnet is caused to advance to press the receiving portion so that the rotor is rotated in one direction, whereas a slider of the non-selected electromagnet is caused to retreat due to being pressed by the pressure receiving portion.

24 Claims, 5 Drawing Sheets

COOLING CYCLE

COOLING CYCLE

HEATING CYCLE

HEATING CYCLE

ROTATION SWITCHING MECHANISM IN ROTARY TYPE SWITCHING VALVE

BACKGROUND OF THE INVENTION

1. Field of the Invention

This invention relates to a switching mechanism such as a heating-cooling mode switching valve in a heating-cooling apparatus, namely, an air-conditioning apparatus, and more particularly to a rotation switching mechanism in a rotary type switching valve in which a movable switching valve consists of a rotor.

2. Brief Description of the Prior Art

Heretofore, there have been known a sliding type switching valve and a rotary type switching valve to serve as a cooling-heating mode switching valve in a heating-cooling apparatus. In the rotary type switching valve, a means for driving a rotor to serve as the movable valve comprises an electromagnet having a return spring. Sliding of the slider in one direction caused by supplying electric current to the electromagnet and sliding of the slider in the other direction caused by the spring, cause the rotor to be rotated by a predetermined angle.

However, the above conventional switching mechanism has shortcomings in that, when the spring becomes fatigued, the stroke of the slider caused by the spring is not uniform with the stroke of the slider caused by supply of electric current, and as a result, a predetermined angle of rotation of the rotor and the switching valve are not reliable.

Moreover, due to play of a connecting portion between the slider and the rotor, the above-mentioned non-uniformity is increased. In addition, since the slider is required to be slid normally in one direction against the load of the spring, the force of the electromagnet is not efficiently transmitted to the rotor and, as a result, provision of an electromagnet having a large capacity is required.

The present invention has been accomplished in view of the above situation.

SUMMARY OF THE INVENTION

It is, therefore, a general object of the present invention to provide a rotation switching mechanism in a rotary type switching valve in which the above-mentioned shortcomings inherent in the prior art can be obviated.

To achieve the above object, from one aspect of the present invention, there is essentially provided a rotation switching mechanism in a rotary type switching valve comprising a rotor serving as a movable switching valve; a pressure receiving portion disposed at an eccentric position of the rotor and rotatable in unison with the rotor; and a first electromagnet and a second electromagnet placed opposite the first electromagnet with the pressure receiving portion situated therebetween. The first and second electromagnets are formed of one-way bias type electromagnets having no return springs. By supplying electric current to a selected one of the first and second electromagnets, a slider of the selected electromagnet is caused to advance to press the receiving portion so that the rotor is rotated in one direction, whereas a slider of the non-selected electromagnet is caused to retreat due to being pressed by the pressure receiving portion.

It is preferred that the slider of the first electromagnet and the slider of the second electromagnet are connected together such that the sliders can slide in unison.

From another aspect of the present invention, there is also provided a rotation switching mechanism in a rotary type switching valve comprising a rotor serving as a movable switching valve; a pressure receiving portion disposed at an eccentric position of the rotor and rotatable in unison with the rotor; and a first electromagnet and a second electromagnet placed opposite the first electromagnet with the pressure receiving portion situated therebetween. The first and second electromagnets are formed of one-way bias type electromagnets having no return springs. A slider of the first electromagnet and a slider of the second electromagnet are connected together such that the sliders can slide in unison. By supplying electric current to a selected one of the first and second electromagnets, the slider of the selected electromagnet is caused to retreat and the slider of the non-elected electromagnet is caused to advance following the movement of the slider of the selected electromagnet to press the receiving portion so that the rotor is rotated in one direction.

The rotor may be provided with an eccentric pin extending from one end of a shaft thereof such that each of the sliders acts on a peripheral surface of the eccentric pin.

It is preferred that the pressure receiving surface of the pressure receiving portion on which each of the sliders acts is an arcuate surface in a circumferential direction of the rotor.

The pressing surface of the pressing portion on which each of the sliders acts may extend in a tangential direction of the pressure receiving surface.

Various advantages and features which characterize the present invention are pointed out with particularity in the claims annexed hereto and form a part thereof. However, for a better understanding of the present invention, its advantages, and objects attained by its use, reference should be had to the drawings, which form a further part thereof, and to the accompanying descriptive manner, in which there is illustrated and described a preferred embodiment of the present invention.

DETAILED DESCRIPTION OF THE PREFERRED EMBODIMENTS

A rotation switching mechanism in a rotary type switching valve according to the present invention will now be described in detail with reference to the accompanying drawings which constitute a part of this specification.

Figure 1A:
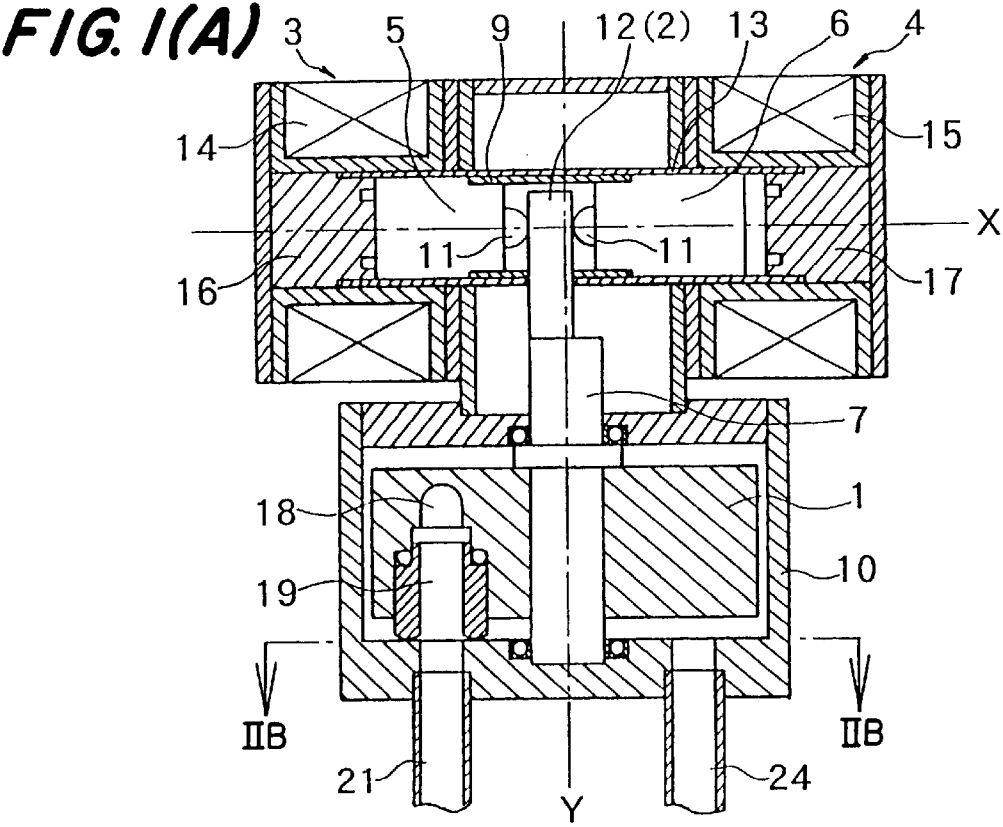
FIGS. 1(A) and 1(B) are vertical sectional views respectively showing the first and second switching states of a switching mechanism applied to a rotary type switching valve in a heating-cooling apparatus.
Figure 1B:
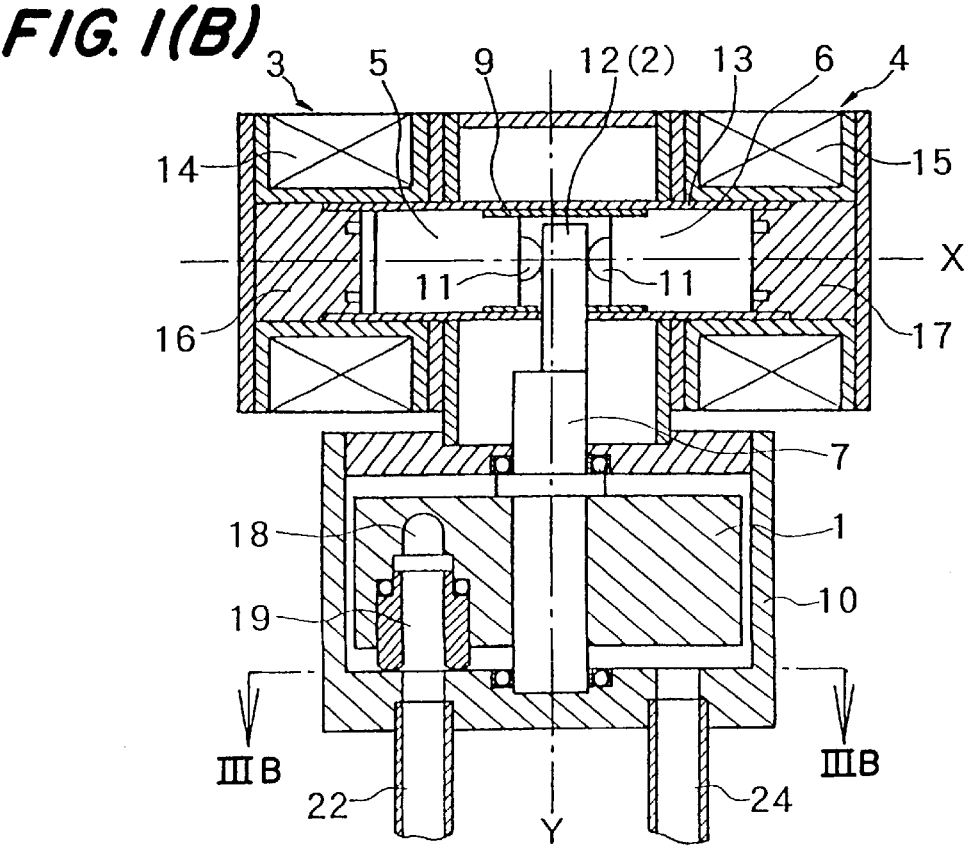

As shown in FIGS. 1(A) and 1(B), a rotor 1 is received in a cylindrical closed hollow housing 10 such that the rotor 1 is coaxial with an axis Y, and the rotor 1 is rotatably supported for rotation about the axis Y. A shaft 7 for the rotor 1 is allowed to extend through an upper end wall of the housing 10 and project outwardly. The shaft 7 is provided at an end face thereof with an eccentric pin 12 extending parallel with the shaft 7. This eccentric pin 12 serves as a pressure receiving portion 2 and is a circular column-like member.

A first electromagnet 3 and a second electromagnet 4 are disposed opposite one another with the eccentric pin 12 (pressure receiving portion 2) situated therebetween. One way bias type electromagnets having no return springs are employed as first and second electromagnets 3 and 4. A slider 5 of the first electromagnet 3 and a slider 6 of the second electromagnet 4 are preferably connected through a connecting member 9 such that the sliders 5 and 6 can slide in unison; however, the sliders 5 and 6 can alternatively be unconnected.

Both of the sliders 5 and 6 are reciprocally movably received in a guide sleeve 13 formed of a cylindrical member having an axis coaxial with the axis X. The guide sleeve 13 is provided at peripheral surfaces of opposite ends thereof with coil portions 14 and 15 of the first and second electromagnets 3 and 4. Electromagnets 16 and 17 are fitted in sleeve portions of the opposite ends of the guide sleeve 13. Upon supply of electric current to the coil portions 14 and 15, the sliders 5 and 6 are caused to retreat and advance, biased by the electromagnets 16 and 17.

As previously mentioned, the first and second electromagnets 3 and 4 are linearly arranged opposite one another. Accordingly, the sliders 5 and 6 are arranged opposite one another such that the co-axes X thereof are linear. This sliding axis X is perpendicular to the rotary axis Y of the rotor 1.

The rotor 1 is made of a solid metal block. A generally U-shaped air passage 18 is formed in the rotor 1. Opposite ends of the passage 18 are opened at one end face of the rotor 1 to define ventilating ports 19 and 20, respectively (see FIGS. 2(A) and 3(A)). Ventilating ports 21, 22 and 23 are allowed to extend through an end wall of a lower portion of the housing 10 placed opposite the end face of the rotor 1 and are communicated with and alternately switched with respect to the ventilating ports 19 and 20. A ventilating port 24 is allowed to extend through the end wall of the lower portion of the housing 10 and open to the interior of the housing 10.

The ventilating port 21 is connected to one end of a condenser 25, and the other end of the condenser 25 is connected to the ventilating port 23. A high pressure outlet port of a compressor 26 is connected to the ventilating port 22 and a low pressure inlet port of the compressor 26 is connected to the ventilating port 24.

Figure 4A:
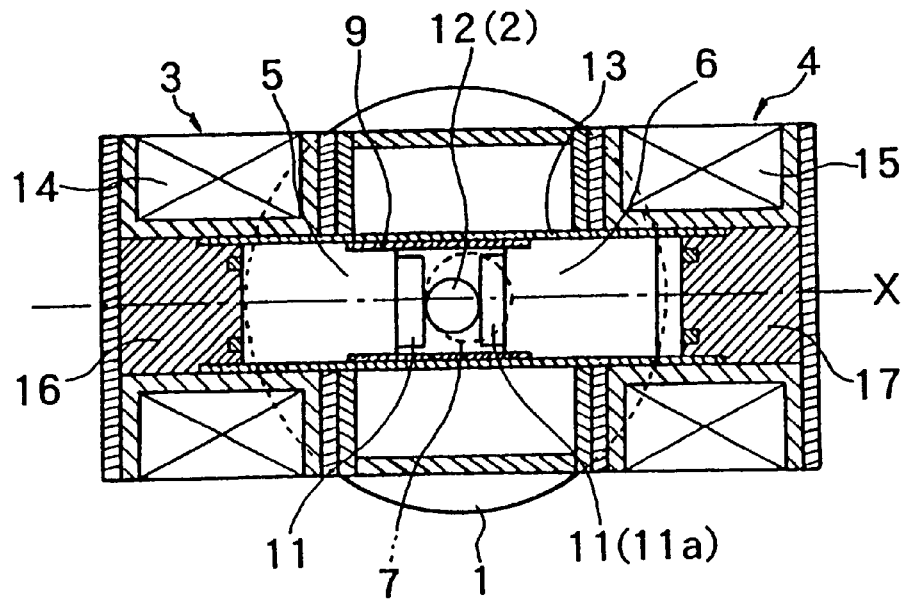
FIGS. 4(A) and 4(B) are cross sectional views of the rotary mechanism in the rotary type switching valve of FIG. 1, showing the first and second switching states, respectively.

As shown in FIG. 4(A), when the slider 5 is caused to retreat along the axis X by the energized first electromagnet 3, the slider 6 of the non-energized second electromagnet 4 is caused to advance through the connecting member 9, following the movement of the slider 5. Then, the eccentric pin 12 serving as the pressure receiving portion 2 is pressed by the pressing portion 11 of the slider 6 thus advanced. As a consequence, as shown in FIGS. 2(A) and 2(B), the rotor 1 is rotated a predetermined angle in one direction, thereby creating a first switching state (cooling state).

Figure 2A:
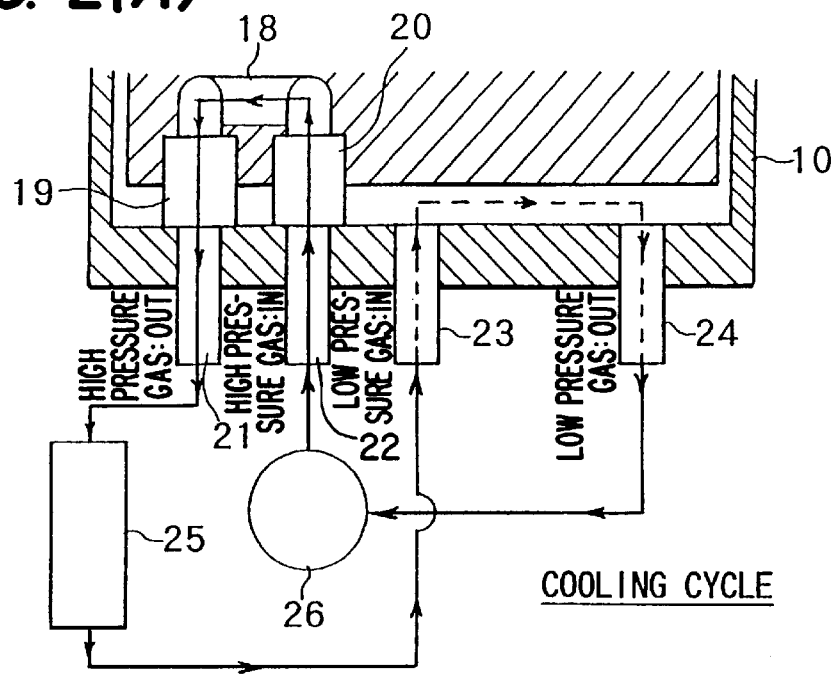
FIG. 2(A) is a vertical sectional view of a main portion of the switching valve, showing the first switching state in FIG. 1(A)
Figure 2B:
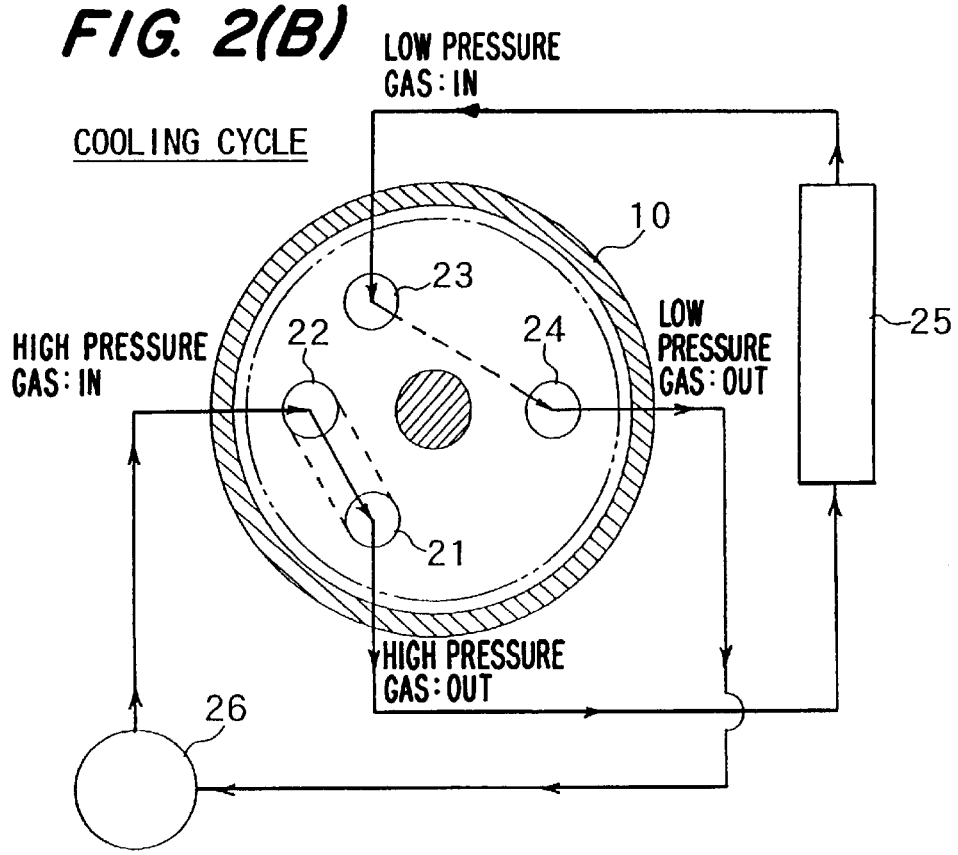
FIG. 2(B) is a developed sectional view taken on line IIB—IIB of FIG. 1(A), showing the first switching state.

More specifically, when the rotor 1 is rotated in one direction, to the position shown in FIGS. 2(A) and 2(B), the ventilating ports 19 and 21 are communicated with each other and the ventilating ports 20 and 22 are also communicated with each other. As a consequence, a high pressure gas from the compressor 26 enters one end of the condenser 25 via the ventilating ports 22 and 20, and the ventilating ports 19 and 21, whereas a low pressure gas from the other end of the condenser 25 is discharged into the housing 10 through the ventilating port 23 so as to fill the interior of the housing 10. Then, the low pressure gas in the housing 10 is introduced into a low pressure gas inlet port of the compressor 26 through the ventilating port 24. The foregoing procedures establish a cooling cycle.

Figure 4B:
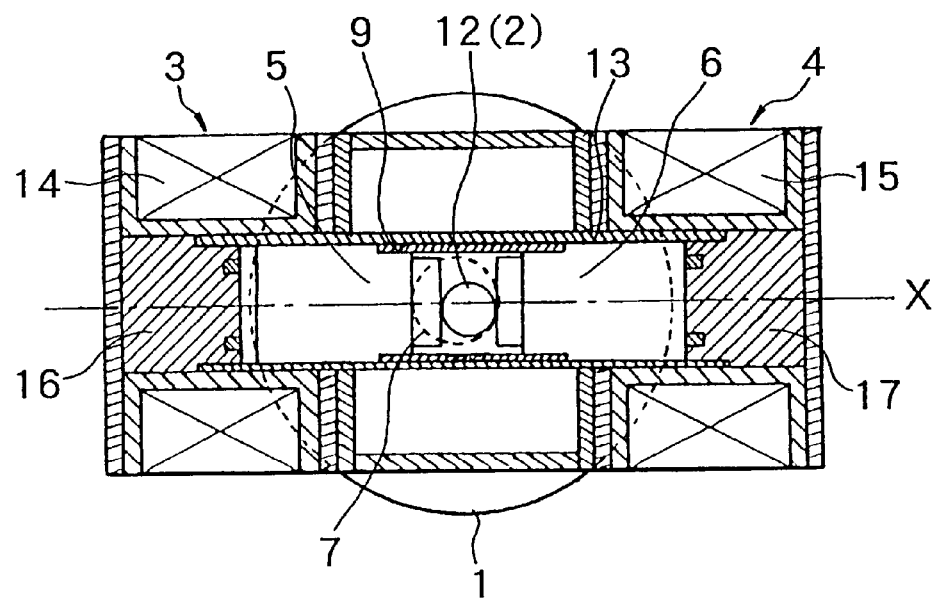
Figure 5A:
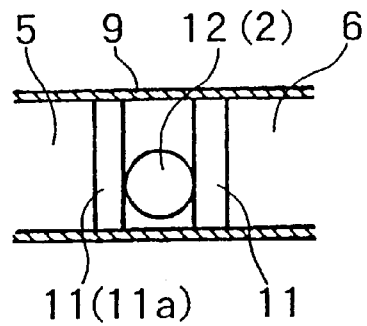
FIG. 5(A) is a cross sectional view of a main portion showing one example of a pressing portion of a slider in the switching mechanism.
Figure 5B:
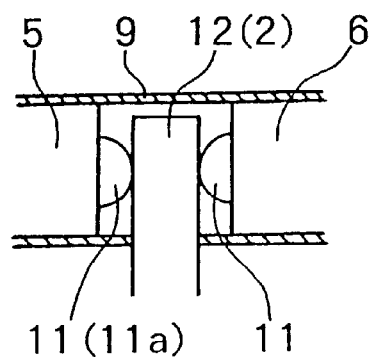
FIG. 5(B) is a vertical sectional view of the same.

In contrast, as shown in FIG. 4(B), when the slider 6 is caused to retreat along the axis X by the energized second electromagnet 4, the slider 5 of the non-energized first electromagnet 3 is caused to advance through the connecting member 9, following the movement of the slider 6. Then, the eccentric pin 12 serving as the pressure receiving portion 2 is pressed by the pressing portion 11 of the slider 5 thus advanced. As a consequence, the rotor 1 is rotated by a predetermined angle in the other direction, thereby creating a second switching state (heating state).

Figure 3A:
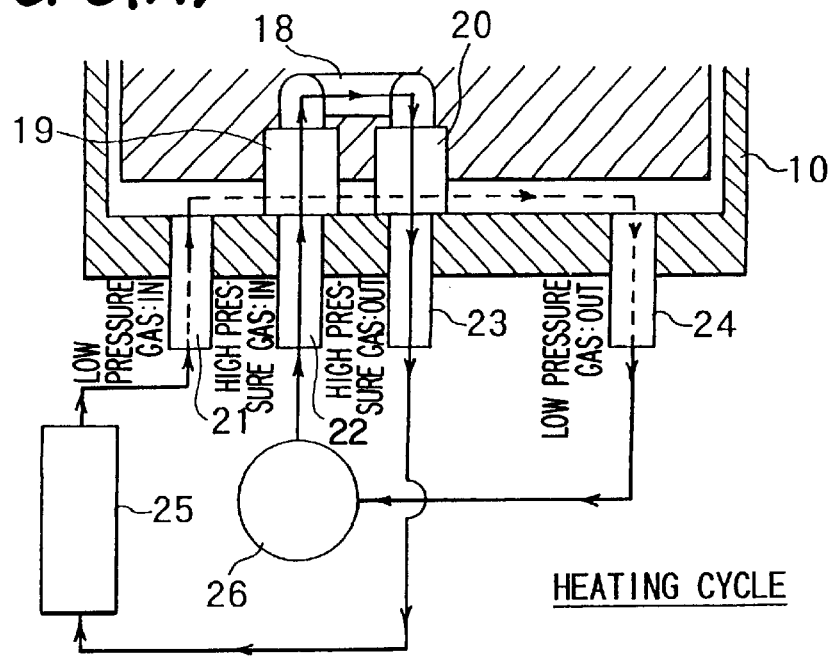
FIG. 3(A) is a vertical sectional view of a main portion of the switching valve, showing the second switching state in FIG. 1(B)
Figure 3B:
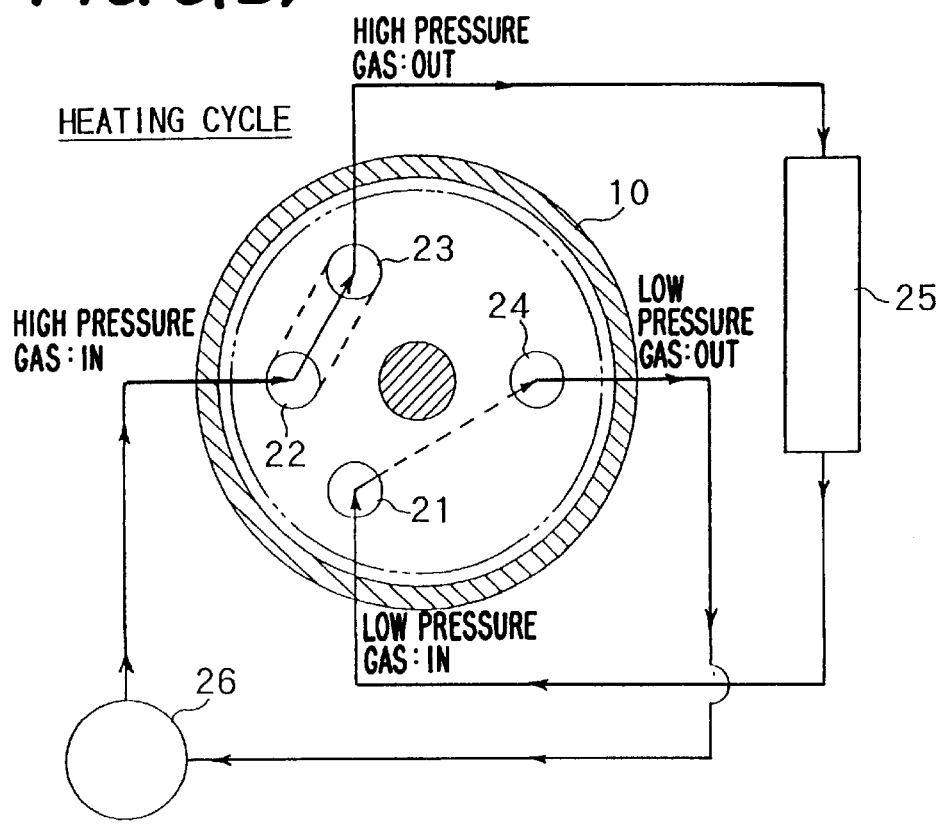
FIG. 3(B) is a developed sectional view taken on line IIIB—IIIB of FIG. 1(B), showing the second switching state.

More specifically, when the rotor 1 is rotated in the other direction, to the position shown in FIGS. 3(A) and 3(B), the ventilating ports 19 and 22 are communicated with each other and the ventilating ports 20 and 23 are communicated with each other. As a consequence, a high pressure gas from the compressor 26 enters the other end of the condenser 25 via the ventilating ports 22, 19, the air passage 18 and the ventilating ports 20 and 23, whereas a low pressure gas from one end of the condenser 25 is discharged into the housing 10 through the ventilating port 21 so as to fill the interior of the housing 10. Then, the low pressure gas in the housing 10 is introduced into a low pressure gas inlet port of the compressor 26 through the ventilating port 24. The foregoing procedures establish a heating cycle.

In FIGS. 1(A) through 4(B), the sliders 5 and 6 are shown connected together through the connecting member 9. However, it is possible to have the sliders 5 and 6 unconnected by a connecting member and have the selected one of the sliders, 5 or 6, to advance upon energization of the electromagnet 3 or 4, so that the rotor 1 is switched in the same manner as mentioned above. This arrangement is different from the above-mentioned embodiments only in the respect that when the one of the sliders, 5 or 6, is caused to advance by supply of electric current and press the pressure receiving portion 2, the remaining slider, 6 or 5, is caused to retreat, following the movement of the first-mentioned slider, 5 or 6.

As apparent from the fact that the pressure receiving portion 2 is defined by the circular column-like eccentric pin 12 (i.e. having a circular cross section), the pressure receiving surface of the pressure receiving portion 2, on which the pressing surface of a selected one of the sliders, 5 or 6, acts, can be formed by an arcuate surface in the circumferential direction of the rotor 1. It is preferred that the pressure receiving surface is formed by an arcuate surface.

As shown in FIGS. 4(A)–6(B), the pressing surfaces of the pressing portions 11 of the sliders 5 and 6 extend in a tangential direction of the pressing surfaces. As one example, as shown in FIGS. 5(A) and 5(B), each pressing portion 11 is formed by a rib 11a having an arcuate, trapezoidal or triangular shape. This rib 11a is projected along a diameter line of the end face of the slider 5 or 6, and a ridge of the rib 11a is abutted with an arcuate surface (pressure receiving surface) of the pressure receiving surface. Owing to this arrangement, even when the eccentric pin 12 is eccentrically rotated into a position offset from the axis X, its contacting state with the pressing surface of the pressing portion 11 can be maintained.

Figure 6A:
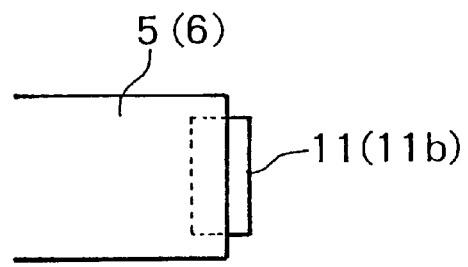
FIG. 6(A) is a plan view of a main portion showing another example of the pressing portion.
Figure 6B:
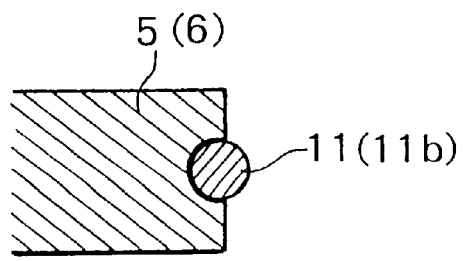
FIG. 6(B) is a vertical sectional view of the same.

As shown in FIGS. 6(A) and 6(B), the pressing portion 11 can be formed by a needle bearing lib projecting along a diameter line of a front end face of the slider 5 or 6.

More specifically, FIG. 6 shows an example in which the rib 11a is rotatable. In the example of FIG. 6, while exhibiting the same effect as in FIG. 5, the needle bearing 11b, while rotating, presses the pressure receiving surface, so that the pressure receiving portion 2 and the rotor 1 can be rotated smoothly. The pressing portion 11 may be formed by a ball bearing or the like, so that the pressing surface is spherical.

The present invention is not only suited to be used as a switching valve in a heating-cooling apparatus but also as a rotation switching mechanism in a rotary type switching valve in which a flow passage for liquid or gas can be switched by rotating the rotor 1 by a predetermined angle. The term "switch" used here also refers to merely closing or opening of the flow passage for liquid or gas.

As described in the foregoing, according to the present invention, electric current is supplied to a selected one of the one way bias type first and second electromagnets which are arranged as mentioned above. By doing this, a selected one of the sliders is caused to slide in one direction, so that the rotor forming a movable switching valve is properly rotated by a predetermined angle. As a consequence, a highly reliable switching can be carried out.

The present invention does not have the shortcomings of the prior art employing a two-way bias type electromagnet operable by a spring and by supply of electric current, in that efficiency is lowered by the spring of the electromagnet and capacity is increased. According to the present invention, the switching can efficiently and reliably be carried out by an electromagnet of a small capacity, and is, therefore, suited to be used as a rotation switching mechanism for a rotary type switching valve.

Although specific embodiments of the invention have been described, it will be appreciated that the invention is susceptible to modification, variation and change without departing from its proper scope as exemplified by the following claims.

I claim:

1. A rotary switching mechanism in a rotary switching valve, comprising:
   a rotor rotatable about a rotation axis;
   an eccentric pin fixed to said rotor and extending in an axial direction from said rotor, said eccentric pin being disposed eccentrically relative to said rotation axis of said rotor and constituting a pressure receiving portion;
   first and second electromagnets located opposite one another on opposing sides of said eccentric pin along a line normal to said rotation axis;
   wherein each of said first and second electromagnets comprises a slider movable between an advanced position and a retracted position; and
   wherein, upon energization of a selected one of said first and second electromagnets, said slider thereof is caused to move to said advanced position to press against said pressure receiving portion to thereby cause rotation of said rotor in one direction, and such that said pressure receiving portion presses against said slider of the non-selected one of said first and second electromagnets to cause said slider of said non-selected one of said first and second electromagnets to move to said retracted position.

2. A rotary switching mechanism in a rotary switching valve, as recited in claim 1, wherein
   said rotor comprises a movable switching valve member.

3. A rotary switching mechanism in a rotary switching valve, as recited in claim 2, wherein
   said first and second electromagnets have no return springs.

4. A rotary switching mechanism in a rotary switching valve, as recited in claim 1, wherein
   said rotor comprises a rotor member, and a rotor shaft extending from and being coaxial with said rotor member; and
   said eccentric pin is fixed to and extends axially from said rotor shaft.

5. A rotary switching mechanism in a rotary switching valve, as recited in claim 1, wherein
   said eccentric pin is circular in cross section and has a circumferential pressure receiving surface.

6. A rotary switching mechanism in a rotary switching valve, as recited in claim 4, wherein
   each of said sliders comprises a pressing surface against which said circumferential pressure receiving surface of said eccentric pin presses.

7. A rotary switching mechanism in a rotary switching valve, as recited in claim 6, wherein
   said pressing surface of each of said sliders comprises a needle bearing.

8. A rotary switching mechanism in a rotary switching valve, as recited in claim 1, wherein
   each of said sliders comprises a pressing surface against which said pressure receiving portion presses.

9. A rotary switching mechanism in a rotary switching valve, as recited in claim 8, wherein
   said pressing surface of each of said sliders comprises a rib.

10. A rotary switching mechanism in a rotary switching valve, as recited in claim 8, wherein
    said pressing surface of each of said sliders extends in a tangential direction of a pressure receiving surface of said pressure receiving portion.

11. A rotary switching mechanism in a rotary switching valve, as recited in claim 8, wherein
    said pressing surface of each of said sliders comprises a needle bearing.

12. A rotary switching mechanism in a rotary switching valve, as recited in claim 1, wherein
    said slider of said first electromagnet is connected together for unitary movement with said slider of said second electromagnet.

13. A rotary switching mechanism in a rotary switching valve, comprising:
    a rotor rotatable about a rotation axis;
    an eccentric pin fixed to said rotor and extending in an axial direction from said rotor, said eccentric pin being disposed eccentrically relative to said rotation axis of said rotor and constituting a pressure receiving portion;
    first and second electromagnets located opposite one another on opposing sides of said eccentric pin along a line normal to said rotation axis;

wherein each of said first and second electromagnets comprises a slider movable between an advanced position and a retracted position; and wherein said slider of said first electromagnet is connected together for unitary movement with said slider of said second electromagnet;

wherein, upon energization of a selected one of said first and second electromagnets, said slider thereof is caused to move to said retracted position and said slider of the non-selected one of said first and second electromagnets is caused to move to said advanced position, to press against said pressure receiving portion to thereby cause rotation of said rotor in one direction.

14. A rotary switching mechanism in a rotary switching valve, as recited in claim 13, wherein said rotor comprises a movable switching valve member.

15. A rotary switching mechanism in a rotary switching valve, as recited in claim 14, wherein said first and second electromagnets have no return springs.

16. A rotary switching mechanism in a rotary switching valve, as recited in claim 13, wherein said rotor comprises a rotor member, and a rotor shaft extending from and being coaxial with said rotor member; and said eccentric pin is fixed to and extends axially from said rotor shaft.

17. A rotary switching mechanism in a rotary switching valve, as recited in claim 13, wherein said eccentric pin is circular in cross section and has a circumferential pressure receiving surface.

18. A rotary switching mechanism in a rotary switching valve, as recited in claim 17, wherein each of said sliders comprises a pressing surface against which said circumferential pressure receiving surface of said eccentric pin presses.

19. A rotary switching mechanism in a rotary switching valve, as recited in claim 17, wherein said pressing surface of each of said sliders comprises a needle bearing.

20. A rotary switching mechanism in a rotary switching valve, as recited in claim 13, wherein each of said sliders comprises a pressing surface against which said pressure receiving portion presses.

21. A rotary switching mechanism in a rotary switching valve, as recited in claim 20, wherein said pressing surface of each of said sliders comprises a rib.

22. A rotary switching mechanism in a rotary switching valve, as recited in claim 20, wherein said pressing surface of each of said sliders extends in a tangential direction of a pressure receiving surface of said pressure receiving portion.

23. A rotary switching mechanism in a rotary switching valve, as recited in claim 20, wherein said pressing surface of each of said sliders comprises a needle bearing.

24. A rotary switching mechanism in a rotary switching valve, as recited in claim 13, wherein said slider of said first electromagnet is connected together for unitary movement with said slider of said second electromagnet.

* * * * *